United States Patent
Pöyhönen et al.

(10) Patent No.: US 8,250,184 B2
(45) Date of Patent: Aug. 21, 2012

(54) SYSTEM, NETWORK ENTITIES AND COMPUTER PROGRAMS FOR CONFIGURATION MANAGEMENT OF A DYNAMIC HOST CONFIGURATION PROTOCOL FRAMEWORK

(75) Inventors: Petteri Pöyhönen, Helsinki (FI); Janne Tuononen, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 1289 days.

(21) Appl. No.: 11/129,382

(22) Filed: May 16, 2005

(65) Prior Publication Data

US 2006/0015513 A1 Jan. 19, 2006

(30) Foreign Application Priority Data

Jul. 13, 2004 (FI) .................................. 20040978

(51) Int. Cl.
*G06F 15/16* (2006.01)
(52) U.S. Cl. ........................ 709/220; 709/221
(58) Field of Classification Search .................. 709/220, 709/223, 238, 221; 713/169, 160; 370/349, 370/389, 401; 707/999.1
See application file for complete search history.

(56) References Cited

U.S. PATENT DOCUMENTS

| | | | | |
|---|---|---|---|---|
| 6,614,774 B1* | 9/2003 | Wang | | 370/338 |
| 6,615,255 B1* | 9/2003 | Blaszczak | | 709/220 |
| 7,046,657 B2* | 5/2006 | Harrington et al. | | 370/350 |
| 7,194,554 B1* | 3/2007 | Short et al. | | 709/246 |
| 7,206,318 B2* | 4/2007 | Keller | | 370/433 |
| 7,219,367 B2* | 5/2007 | Briggs | | 725/139 |
| 7,225,238 B1* | 5/2007 | Dantu et al. | | 709/219 |
| 7,302,476 B1* | 11/2007 | Howarth et al. | | 709/220 |
| 7,464,145 B2* | 12/2008 | Strassner | | 709/220 |
| 7,574,217 B1* | 8/2009 | Leung et al. | | 455/456.1 |
| 7,630,341 B2* | 12/2009 | Buddhikot et al. | | 370/331 |
| 7,983,685 B2* | 7/2011 | Silverstrim et al. | | 455/447 |
| 8,046,000 B2* | 10/2011 | Sylvain | | 455/456.3 |
| 2002/0052876 A1* | 5/2002 | Waters | | 707/100 |
| 2002/0137526 A1* | 9/2002 | Shinohara | | 455/456 |
| 2002/0151313 A1* | 10/2002 | Stead | | 455/456 |
| 2003/0064731 A1* | 4/2003 | Angelo et al. | | 455/456 |
| 2003/0074430 A1* | 4/2003 | Gieseke et al. | | 709/221 |
| 2003/0235163 A1* | 12/2003 | Montz et al. | | 370/331 |
| 2004/0088385 A1* | 5/2004 | Blanchet et al. | | 709/220 |
| 2004/0092271 A1* | 5/2004 | Viikari et al. | | 455/456.2 |
| 2004/0111640 A1* | 6/2004 | Baum | | 713/201 |
| 2004/0128367 A1* | 7/2004 | Piercy et al. | | 709/220 |
| 2005/0059410 A1* | 3/2005 | Trossen et al. | | 455/456.1 |
| 2005/0148342 A1* | 7/2005 | Sylvain | | 455/456.3 |
| 2006/0034211 A1* | 2/2006 | Kojima | | 370/328 |
| 2006/0047835 A1* | 3/2006 | Greaux | | 709/229 |
| 2007/0174435 A1* | 7/2007 | Piercy et al. | | 709/220 |
| 2008/0092228 A1* | 4/2008 | Baum | | 726/13 |

FOREIGN PATENT DOCUMENTS

EP 1 039 685 A2 9/2000
EP 1 370 026 A1 12/2003

* cited by examiner

*Primary Examiner* — Ario Etienne
*Assistant Examiner* — Sargon Nano
(74) *Attorney, Agent, or Firm* — Squire Sanders (US) LLP

(57) ABSTRACT

A system, network entities and computer programs to provide a dynamic configuration data storage system for both a standard DHCPv4 and DHCPv6 framework. Together with standard DHCPv4 and DHCPv6 protocol functionalities, the invention provides auto-configuration of configuration parameters from network servers to hosts, e.g. to mobile terminals.

21 Claims, 5 Drawing Sheets

PRIOR ART

SYSTEM, NETWORK ENTITIES AND COMPUTER PROGRAMS FOR CONFIGURATION MANAGEMENT OF A DYNAMIC HOST CONFIGURATION PROTOCOL FRAMEWORK

BACKGROUND OF THE INVENTION

1. Field of the Invention

The present invention relates to packet data networks. In particular, the present invention relates to a novel and improved system, and network entities for configuration management of a dynamic host configuration protocol framework comprising at least one DHCP server, at least one configuration storage and at least one storage manager and at least one network server, wherein a configuration storage is connected to at least one DHCP server, a configuration storage is connected to at least one DHCP server and a storage manager is connected to at least one configuration storage and to at least one network server.

2. Description of the Related Art

The DHCP (Dynamic Host Configuration Protocol) is a communication protocol that lets network administrators manage centrally and automate the assignment of Internet Protocol (IP) addresses e.g. in an organization's network. Using the Internet Protocol, each machine that can connect to the Internet needs a unique IP address. When an organization sets up its computer users with a connection to the Internet, an IP address must be assigned to each machine. Without the DHCP, in IPv4 the IP address must be entered manually in each computer and, if computers move to another location in another part of the network, a new IP address must be entered. IPv6 provides a stateless address autoconfiguration functionality (Neighborhood Discovery protocol, ND) that can replace the address assignment functionality of the DHCPv6. In other words, in the IPv6, manual address configuration is not the only option if the DHCPv6 is not used. The DHCPv6 is an example of a statefull address auto-configuration method for the IPv6. Furthermore, some proprietary method can also be used to configure IP addresses.

The DHCP lets a network administrator supervise and distribute IP addresses from a central point and automatically sends a new IP address when a computer is plugged into a different place in the network. This is always done in a solicited manner, that is, a computer must explicitly request the network to assign a new address for it.

DHCP server configuration management is typically based on manual configuration of a configuration file, which easily can lead to outdated information being provided to the DHCP clients. FIG. 1 describes a typical prior art solution. A Dynamic Host Configuration Protocol (DHCP) server 10 includes a configuration file 12. Configuration file 12 includes configuration parameters, e.g. assignable IP addresses, so that DHCP server 10 is able to provide services to terminal devices. A user may edit configuration file 12 via a user interface 14.

The configuration file is interpreted by server process in its initializing phase (start/restart). Each time when a change is needed in the server configuration the configuration file or other data storage is manually edited, and to make the changes apply in server process, required procedures are executed, e.g. by restarting the server process.

Manual configuration involves (human) administrator interaction and there is always a possibility of a human error when maintaining manually configuration data. Moreover, it may be a time consuming task and it is not suitable for delivering configuration parameters that have a short lifetime or require frequent updates. Automated or semi-automated generation of configuration parameters may be supported in a network server to decrease extra burden of manual configuration.

Delivering configuration data to the end-user equipment from a network, in a user-friendly manner, is nowadays a problem especially for the mobile terminal vendors. In the future, when the networks are mobile (moving networks), this problem becomes even bigger.

If a network operator has contracts with multiple service and content providers as well as with multiple terminal vendors, there is no generic way in which all those parties may dynamically provide required configuration data for the use of the operator. This has to be done because the operator owns presumably the configuration framework of its network like DHCP framework.

Based on the above, there is an obvious need for a solution that would improve DHCP framework configuration management.

SUMMARY OF THE INVENTION

According to one aspect of the invention there is provided a system for configuration management of a dynamic host configuration protocol framework, the system comprising a dynamic host control protocol server, a configuration storage, a storage manager and a network server. The configuration storage is connected to the dynamic host control protocol server and is configured to store configuration parameters to be used by the dynamic host control protocol server. The storage manager is connected to the configuration storage and to the network server and is configured to maintain content in the configuration storage and manage signaling and data transfer between the configuration storage and the network server. The network server is connected to the storage manager and is configured to provide the storage manager with the configuration parameters. Furthermore, the storage manager dynamically updates configuration data in the configuration storage.

In one embodiment of the invention, the storage manager is configured to remove expired configuration data content from the configuration storage.

In one embodiment of the invention, the storage manager is configured to monitor configuration data content in the configuration storage and to request updated configuration data content from the network server; and the network server is configured to provide the storage manager with updated configuration data in response to receiving a request for the updated configuration data content from the storage manager if the updated configuration data is available.

In one embodiment of the invention, the configuration storage is configured to trigger a configuration data content request to the one storage manager if applicable configuration data does not exist in the configuration storage, the storage manager is configured to trigger the configuration data request to at least one network server, the at least one network server is configured to provide the storage manager with the applicable configuration data in response to the configuration data request if the applicable configuration data is available, and the storage manager is configured to provide the configuration storage with the applicable configuration data in response to the configuration data content request if the applicable configuration data is available.

In one embodiment of the invention, the storage manager is configured to trigger the configuration data content request to the network server, and the network server is configured to provide the storage manager with the applicable configuration data in response to the configuration data content request if the applicable configuration data is available. In one embodiment of the invention, the network server checks whether the storage manager is allowed to receive the applicable configuration data, wherein the network server is configured to provide the storage manager with the applicable configuration data only if the storage manager is allowed to receive the applicable configuration data.

In one embodiment of the invention, the storage manager is configured to trigger a configuration data content request to the at least one network server based on at least one of the following rules: the configuration storage sent the configuration data content request for non-existent configuration data to the storage manager, the configuration data in the configuration storage is about to expire and an updated piece of configuration data is needed, or expiring configuration data is marked as essential in the configuration storage.

In one embodiment of the invention, the network server is configured to send updated configuration data to the storage manager automatically. In another embodiment, the network server is configured to send the updated configuration data to the storage manager automatically before the configuration data in the configuration storage expires.

In one embodiment of the invention, the configuration storage is configured to include terminal device location dependant configuration data, the configuration storage is configured to receive a location dependent configuration data request from at least one dynamic host control protocol server, and the configuration storage is configured to provide the at least one dynamic host control protocol server with a location dependent configuration data in response to the location dependent configuration data request.

In one embodiment of the invention, the network server and the storage manager are configured to establish a relationship between each other in order to exchange information. In one embodiment of the invention, the network server is configured to use pre-existing relationship between the network server and the storage manager in order to exchange information.

In one embodiment of the invention, each service entry in the configuration storage comprises at least one of the following: a unique service identifier identifying a service, the configuration data, and a time-to-live value for the configuration data.

In one embodiment of the invention, a single entity comprises the dynamic host control protocol server, the configuration storage, the storage manager and the network server.

In one embodiment of the invention, the system comprises at least one of the following configurations: a configuration storage is connected to at least one dynamic host control protocol server and to at least one storage manager; a storage manager is connected to at least one configuration storage and to at least one network server; and a network server is connected to at least one storage manager.

According to another aspect of the invention there is provided storage manager for configuration management of a dynamic host configuration protocol framework, wherein the storage manager is connected to the configuration storage and the network server, wherein the storage manager is configured to maintain content in a configuration storage, manage signaling and data transfer between the configuration storage and a network server and dynamically update configuration data in the configuration storage.

In one embodiment of the invention, the storage manager is configured to remove expired configuration data content from the configuration storage.

In one embodiment of the invention, the storage manager is configured to monitor configuration data content in the configuration storage, to request updated configuration data content from the network server and to receive updated configuration data from the network server if the updated configuration data is available.

In one embodiment of the invention, the storage manager is configured to receive a configuration data content request from the configuration storage and to provide the configuration storage with the configuration data in response to the configuration data content request if the configuration data is available, and storage manager is configured to trigger the configuration data request to at least one network server and to receive the applicable configuration data from the at least one network server if the applicable configuration data is available.

In one embodiment of the invention, the storage manager is configured to trigger the configuration data content request to the network server based on at least one of the following rules: the configuration storage sent to the storage manager the configuration data content request for non-existent configuration data, the configuration data in the configuration storage is about to expire and an updated piece of configuration data is needed, or expiring configuration data is marked as essential in the configuration storage.

In one embodiment of the invention, the storage manager is configured to establish a relationship between the network server and the storage manager in order to exchange information. In one embodiment of the invention, the network server is configured to use pre-existing relationship between the network server and the storage manager in order to exchange information.

In one embodiment of the invention, the storage manager is implemented in an entity with at least one of a dynamic host control protocol server and the configuration storage.

According to another aspect of the invention there is provided a configuration storage for configuration management of a dynamic host configuration protocol framework, wherein the configuration storage is connected to a dynamic host control protocol server and to a storage manager, wherein the configuration storage is configured to store configuration parameters used by the dynamic host control protocol server; wherein the configuration storage is configured to be dynamically maintained and updated by a storage manager, and deliver configuration parameters to the dynamic host control protocol server by a dynamic host control protocol server request and to send a configuration data content request to the storage manager if applicable configuration data does not exist in the configuration storage or if the applicable configuration data has expired in the configuration storage.

In one embodiment of the invention, the configuration storage is configured to include terminal device location dependant configuration data, the configuration storage is configured to receive a location dependent configuration data request from at least one dynamic host control protocol server, and the configuration storage is configured to provide the at least one dynamic host control protocol server with a location dependent configuration data in response to the location dependent configuration data request.

In one embodiment of the invention, the configuration storage is configured to receive a location dependent configuration data content request from the dynamic host control protocol server, and the configuration storage is configured to provide the dynamic host control protocol server with a location dependent configuration data in response to the location dependent configuration data content request.

In one embodiment of the invention, each service entry in the configuration storage comprises at least one of the following: a unique service identifier identifying a service, the configuration data, and a time-to-live value for the configuration data.

In one embodiment of the invention, the configuration storage is implemented in an entity with at least one of the dynamic host control protocol server and the storage manager.

In one embodiment of the invention, the configuration storage is connected to at least one dynamic host control protocol server and to at least one storage manager.

According to another aspect of the invention there is provided a computer program embodied on a computer readable medium for configuration management of a dynamic host configuration protocol framework, wherein the computer program controls a data-processing device to perform the steps of: maintaining content in a configuration storage and managing signaling and data transfer between the configuration storage and a network server, and updating configuration data in the configuration storage dynamically.

According to another aspect of the invention there is provided a computer program embodied on a computer readable medium for configuration management of a dynamic host configuration protocol framework, wherein the computer program controls a data-processing device to perform the steps of: storing configuration parameters used by a dynamic host control protocol server, delivering the configuration parameters to the dynamic host control protocol server, receiving configuration data content maintenance operations from a storage manager, and generating a configuration data content request to the storage manager if applicable configuration data does not exist or if the applicable configuration data has expired.

According to another aspect of the invention there is provided a network server for configuration management of a dynamic host configuration protocol framework, wherein the network server is connected to at least one storage manager, wherein the network server is configured to establish a relationship with a storage manager in order to exchange information, connect to at least one information storage comprising configuration data for a configuration storage and transmit the configuration data to the storage manager.

In one embodiment of the invention, the network server is further configured to receive configuration data content requests from the storage manager.

In one embodiment of the invention, the network server is further configured to check whether the storage manager is allowed to receive the configuration data, wherein the network server is configured to provide the storage manager with the configuration data only if the storage manager is allowed to receive the configuration data.

In one embodiment of the invention, the network server is further configured to automatically transmit unsolicited modified or new configuration data to the storage manager.

In one embodiment of the invention, the network server is further configured to transmit, based on an external trigger, unsolicited, modified, or new configuration data advertisements to the storage manager.

In one embodiment of the invention, the network server is further configured to periodically transmit unsolicited configuration data advertisements to the storage manager.

In one embodiment of the invention, the network server is further configured to transmit, based on an external trigger, at least a subset of the configuration data to the storage manager.

In one embodiment of the invention, the network server is further configured to receive the configuration data from at least one external entity.

In one embodiment of the invention, the network server is further configured to receive management data from at least one external entity.

According to another aspect of the invention there is provided a computer program embodied on a computer readable medium for configuration management of a dynamic host configuration protocol framework, wherein the computer program controls a data-processing device to perform the following steps of: establishing a relationship between a network server and a storage manager in order to exchange information, connecting to at least one information storage comprising configuration data for a configuration storage, and transmitting the configuration data to the storage manager.

According to another aspect of the invention there is provided a system for configuration management of a dynamic host configuration protocol framework, the system comprising a dynamic host control protocol server, a configuration storage connected to the dynamic host control protocol server, a storage manager connected to the configuration storage, a network server connected to the storage manager, storing means for storing configuration parameters used by the dynamic host control protocol server in the configuration storage, maintaining means for maintaining content in the configuration storage and managing signaling and data transfer between the configuration storage and the network server with the storage manager, providing means for providing the storage manager with the configuration parameters with the network server, and updating means for updating configuration data in the configuration storage dynamically by the storage manager.

According to another aspect of the invention there is provided a method for configuration management of a dynamic host configuration protocol framework, the method comprising maintaining content in a configuration storage and managing signaling and data transfer between the configuration storage and a network server, and updating configuration data in the configuration storage dynamically.

According to another aspect of the invention there is provided a system for configuration management of a dynamic host configuration protocol framework, the system comprising maintaining means for maintaining content in a configuration storage, managing means for managing signaling and data transfer between the configuration storage and a network server, and updating means for updating configuration data in the configuration storage dynamically.

According to another aspect of the invention there is provided a method for configuration management of a dynamic host configuration protocol framework, the method comprising storing configuration parameters used by a dynamic host control protocol server, delivering the configuration parameters to the dynamic host control protocol server, receiving configuration data content maintenance operations from a storage manager, and generating a configuration data content request to the storage manager if applicable configuration data does not exist or if the applicable configuration data has expired.

According to another aspect of the invention there is provided a system for configuration management of a dynamic host configuration protocol framework, the system comprising storing means for storing configuration parameters by a dynamic host control protocol server, delivering means for delivering the configuration parameters to the dynamic host control protocol server, receiving means for receiving configuration data content maintenance operations from a storage manager, and generating means for generating a configuration data content request to the storage manager if applicable configuration data does not exist or if the applicable configuration data has expired.

According to another aspect of the invention there is provided a method for configuration management of a dynamic host configuration protocol framework, the method comprising establishing a relationship between a network server and a storage manager in order to exchange information, having connectivity to at least one information storage comprising configuration data for a configuration storage, and transmitting the configuration data to the storage manager.

According to another aspect of the invention there is provided a system for configuration management of a dynamic host configuration protocol framework, the system comprising establishing means for establishing a relationship between a network server and a storage manager in order to exchange information, connecting means for connecting to at least one information storage comprising configuration data for a configuration storage, and transmitting means for transmitting the configuration data to the storage manager.

The invention has several advantages over the prior-art solutions. The invention enables automatic delivery of any network configuration parameter from a network to a DHCP server or DHCP servers. Together with the standard DHCP protocol functionalities the invention provides auto-configuration of configuration parameters from network servers to hosts, e.g. to mobile terminals.

Furthermore, the invention enables "more complete" auto-configuration of a host in a sense that if a configuration storage cannot provide the requested configuration information, the configuration storage tries to retrieve the configuration information from a network so that further requests for those missing pieces of configuration information would be successful.

Furthermore, the invention enables location sensitive IP address and network configuration parameter resolving using the DHCP protocol.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Figure 1:
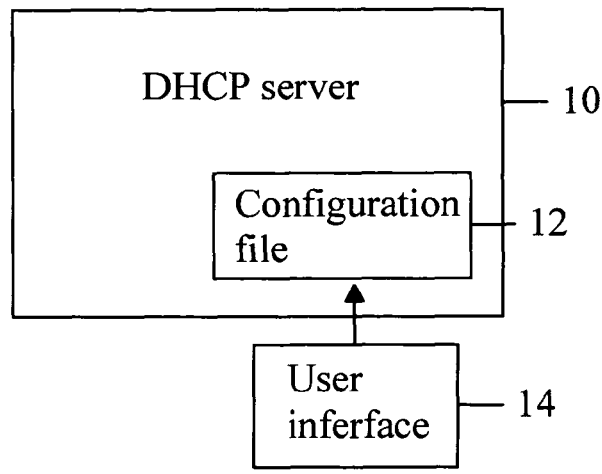
FIG. 1 is a block diagram illustrating a prior art DHCP server configuration.

Reference will now be made in detail to the embodiments of the present invention, examples of which are illustrated in the accompanying drawings.

FIGS. 2-5 disclose different embodiments of the invention. Since the basic functionality is the same in all of them, the figures will be described all together.

DHCP protocols, defined in RFCs (RFC, Request for Comments) RFC 1541 and 3315 can be used to deliver network configuration parameters like a Domain Name System (DNS) server address list from a DHCP server to a DHCP client by the client's explicit request, or the server can add it automatically to any reply, if configured to do so.

The invention at hand introduces a method, system, network nodes and computer programs that together with the standard DHCP functionality mentioned above enable an auto-configuration framework that can be used to deliver any configuration parameters from network servers to hosts, e.g. to a mobile terminal.

The system comprises three important entities in addition to a DHCP server 20. DHCP server 20 is connected to a dynamically updated configuration storage 22. The purpose of configuration storage 22 in the system is to store configuration parameters like DNS, mail, Session Initiation Protocol (SIP) or basically whatever service dependent or independent parameters that are required in a terminal device to enable that specific service or application. A simple format of a configuration parameter one can think of is an Internet Protocol (IP) address or Uniform Resource Locator (URL) address of a server providing a particular service. The main task of configuration storage 22 is to deliver requested configuration parameters to DHCP server 20 by server's request.

In the configuration storage 22, each service entry contains all or some of the following pieces of network server specific information:

Unique service identifier identifying the service in global scope. For example, a globally unique Internet Assigned Numbers Authority (IANA) vendor ID and vendor specific unique service ID.

Configuration data represented either in a service specific or service independent format in such way that both the client and server application have the same interpretation of the data.

Time-to-live (TTL) value for the configuration data.

Configuration storage 22 may also maintain its data consistency by taking care of data read/write locking etc. like a conventional database system. In another embodiment, storage manager 24 is responsible for maintaining data consistency in configuration storage 22.

Configuration storage 22 also generates a specific event to storage manager 24, if some of the requested configurations are not available or have expired in configuration storage 22, so that storage manager 24 may perform some actions, for example, to generate a solicitation message to network server 26.

Configuration storage 22 may also have access control functions, that is, functions relating to which storage managers are allowed to provide configuration data to configuration storage 22.

The configuration data along with the service identifiers are stored in configuration storage 22 as they are received from network server 26. The stored configuration data and the service identifier identifying it typically are application/service specific.

Service identifiers, which can be compared to the option types in the standard DHCP protocol, are also the way for a terminal's applications to notify the DHCP server which configuration data they are requiring. Therefore, service identifiers are used as search keys in queries from the DHCP server to configuration storage 22.

It is always possible that storage manager 24 is not able to provide configuration storage 22 with the requested configuration data. This may happen since a terminal requesting configuration parameters from DHCP server 20 in practice is free to ask anything in the framework and any request resulting no data in configuration storage 22 can trigger storage manager 24 to request missing data from network server 26. It is also possible that storage manager 24 does not provide configuration storage 22 or network server 26 does not provide storage manager 24 with the requested configuration data due to some rule or policy.

The system further comprises a management entity that manages configuration storage 22, herein referred to as a storage manager 24. Storage manager 24 is connected to configuration storage 22 and a network server 26. Storage manager 24 may be responsible for at least of the following functionalities:

Managing the signaling and data transfer between configuration storage 22 and network server 26.

Maintaining the data in configuration storage 22. In other words, as default e.g. removing of expired service entries and optionally requesting from network server 26 updated configuration data.

One feature of storage manager 24 is to provide a set of different methods for network server 26 to transfer its configurations to configuration storage 22. Any viable methods to transfer data between two nodes can be used depending on the requirements like security, reliability, etc.

Storage manager 24 may offer a method or methods that can be used by new servers to create required trust relationship to be able to join the dynamic configuration system. Furthermore, there may be a trust relationship between the storage manager 24 and network servers, and therefore it may be limited which network servers may dynamically access configuration data via the storage manager. This may also mean that different services from trusted servers can join and leave the system at any time. In one embodiment of the invention, network server 26 may use pre-existing trust between network server 26 and storage manager 24 in order to exchange information. The trust may be established dynamically between storage manager 24 and network server 26 or alternatively, storage manager 24 and network server 26 may be preconfigured to have the trust.

Furthermore, when a network server receives a configuration data request from a storage manager, the network server may determine whether it is allowed to process the request from the storage manager, and further, to determine whether the request concerns configuration data that the storage manager has a right to use. Correspondingly, the storage manager may check the integrity of the data received from the network server and the data origin authentication.

A similar functionality may be configured to the interface between a storage manager and configuration storage. When the storage manager receives a configuration data request from the configuration storage, the storage manager may determine whether it is allowed to process the request from the configuration storage, and further, to determine whether the request concerns configuration data that the configuration storage has a right to use. Correspondingly, the configuration storage may check the integrity of the data received from the storage manager and the data origin authentication.

In one embodiment of the invention, storage manager 24 may use pre-existing trust between configuration storage 22 and storage manager 24 in order to exchange information. The trust may be established dynamically between storage manager 24 and configuration storage 22 or alternatively, storage manager 24 and configuration storage 22 may be preconfigured to have the trust.

Figure 2:
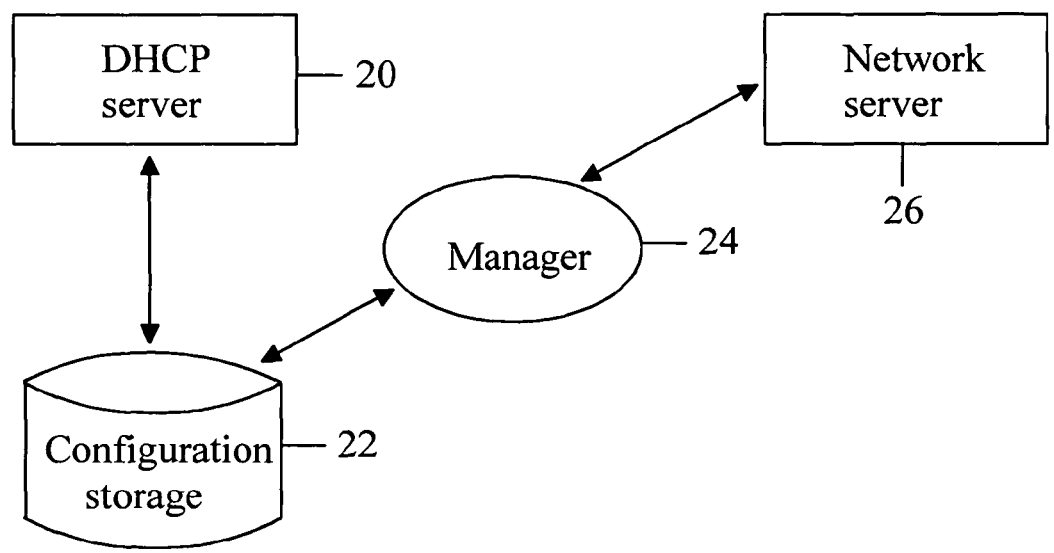
FIG. 2 is a block diagram illustrating a system according to the invention.

In one embodiment of FIG. 2, storage manager 24 is configured to trigger a configuration data content request to network server 26 based on at least one of the following rules: configuration storage 22 sent to storage manager 24 a configuration data content request for non-existent configuration data, configuration data in configuration storage 22 will expire and an updated piece of configuration data is needed, or expiring configuration data is marked as 'essential' in configuration storage 22.

The system further comprises an additional entity in network server 26 that may have at least one of the following functionalities in the system:

Basic data transfer methods including supported protocol signaling, the local data management systems, etc.

The server listens solicitations from storage manager 24 and sends updates according to them, if needed.

To automatically update distributed data in configuration storage 22 before it expires.

To periodically send unsolicited configuration data advertisements to configuration storages via storage manager 24. Advertised configuration data may refer e.g. to all configuration data or to changed configuration data.

To automatically send unsolicited modified or new configuration data advertisements to configuration storages via storage manager 24.

Based on external trigger(s) send unsolicited modified or new configuration data advertisements to configuration storages. The data may not be sent until some entity (e.g. human, internal or external computer program) triggers the sending.

Network server 26 comprises also a configuration database for storing configuration parameters, or alternatively or additionally, it may have been connected to an external database. Network server 26 or some other entity may maintain the configuration data in the database automatically or semi-automatically. Network server 26 may also have an interface to at least one external entity from which it receives configuration data on request or in an unsolicited manner. Network server 26 may have another interface to at least one external entity from which it receives management data. The management data refers e.g. to data based on which network server 26 sends configuration data advertisements to storage manager 24 etc.

When network server 26 receives configuration data requests from storage manager 24, it may send the request further to a predetermined external entity as described above. If network server 26 receives from storage manager 24 a configuration data request that cannot be replied to, it may generate an event e.g. to a log file. The event may indicate where the request came from, to which DHCP server it relates to and what was the missing configuration data etc.

It is obvious that at least one of network server 26 and storage manager 24 may refer to a physical device implementing functions described above or alternatively to a server process running in a computer.

Messaging between storage manager 24 and network server 26 can be either unsolicited, i.e. network server 26 is pushing configuration to storage manager 24. Alternatively, as mentioned under specific circumstances storage manager 24 can generate a solicitation for specific configuration to network server 26.

Both storage manager 24 and network server 26 can be responsible for maintaining the content in configuration storage 22:

Storage manager 24 removes expired content from configuration storage 22.

Storage manager 24 may also monitor the content in configuration storage 22 and notify network server 26 about expiring content.

Network server 26 can, independently of management notification(s), maintain the data in configuration storage 22 it has access to via storage manager 24, or alternatively, it can listen management notifications from storage manager 24 and act according to them when needed.

In FIG. 2, network server 26 may be connected to a plurality of storage managers. Therefore, network server 26 may transfer configuration(s) to a plurality of storage managers. In another embodiment, network server 26 may receive notifications from multiple storage managers 22. Yet in another embodiment, storage manager 24 may manage multiple configuration storages 22. Yet in another embodiment, storage manager 24 may receive solicitation triggers from multiple configuration storages 22. Yet in another embodiment, configuration storage 22 may receive queries from multiple DHCP servers, but in some implementation cases one database per DHCP server is a suitable configuration.

The invention at hand may be implemented in various ways. In the following some of the possible implementation alternatives are disclosed.

Architectural alternatives, system entity relations and system scalability and complexity are dependent on how configuration storage, configuration storage manager and DHCP server are implemented into the system.

Figure 3:
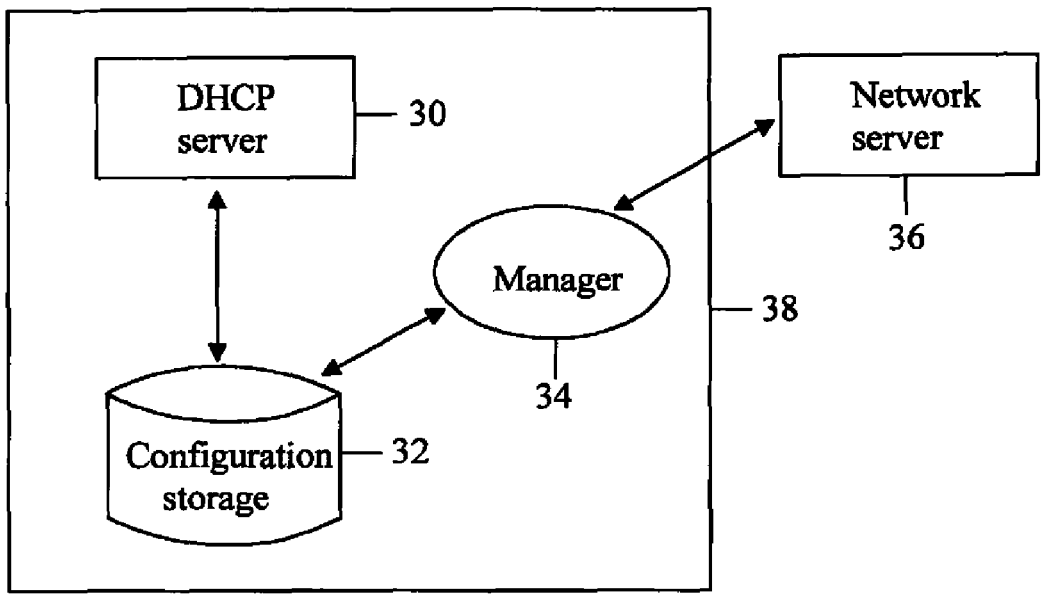
FIG. 3 is a block diagram illustrating another system according to the invention.
Figure 4:
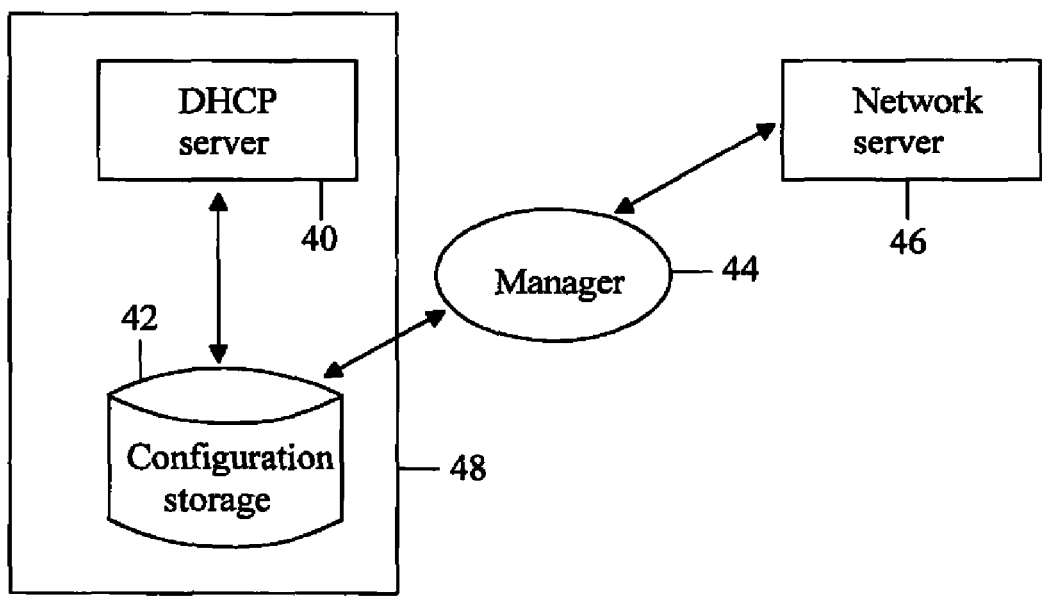
FIG. 4 is a block diagram illustrating another system according to the invention.
Figure 5:
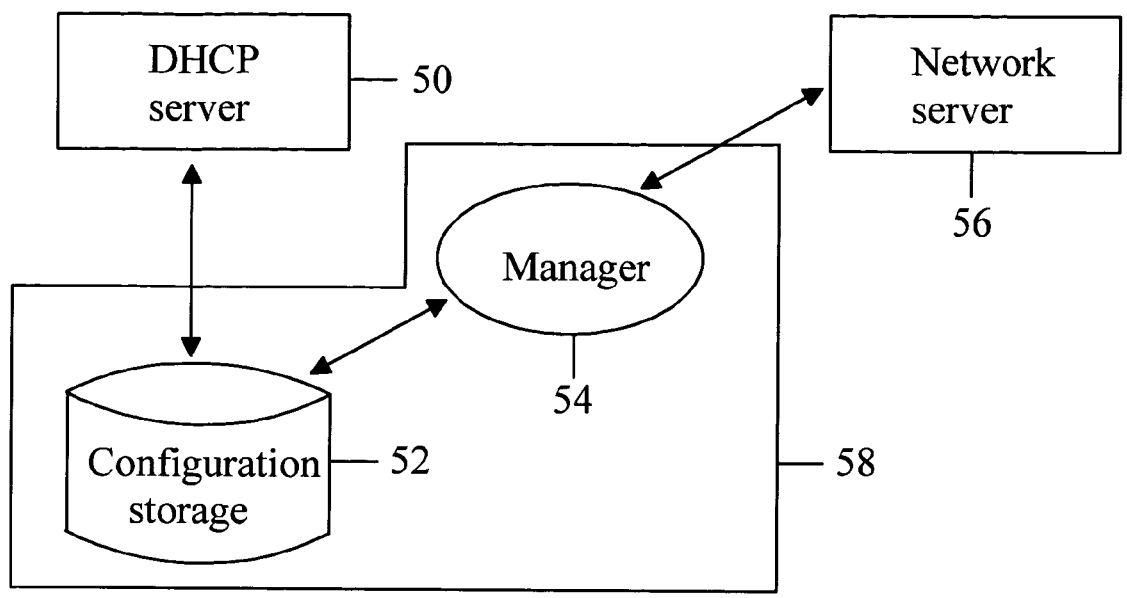
FIG. 5 is a block diagram illustrating another system according to the invention.

In FIGS. 3-5 a rectangle or a polyhedron surrounding certain system entities represents separate implementation module where external signaling is not needed. These module(s), however, are transparent to the hardware configurations, e.g. the modules can be in the same hardware node, or each module can have a separate node.

If configuration storage 32, storage manager 34 and DHCP server 30 are implemented into the same module (FIG. 3, 38), the system entity scalability is simple. In other words, one storage manager only manages one configuration storage, and the DHCP server can have only connected storage. However, multiple network servers 36 can transfer their configuration data to multiple managers.

If only the configuration storage 42 is implemented in the same module with DHCP server 40 (FIG. 4, 48), storage manager 44 becomes more scalable and can be used to manage several configuration storages. Again, multiple network servers 46 can transfer their configuration data to multiple managers.

A third alternative is to have configuration storage 52 and storage manager 54 implemented into the same module (FIG. 5, 58). This architecture corresponds to the first one (FIG. 3), with the exception that the same configuration storage can serve multiple DHCP servers and DHCP server 50 may use several different storages for its queries. Again, multiple network servers 56 can transfer their configuration data to multiple managers.

A fourth alternative was represented in FIG. 2 where all three entities are implemented in different modules. This architecture provides the highest scalability for system entities, but also the entity functionalities become more complex than in other alternatives, because relations between system entities are all many to many and this requires extra management in each system entity.

The special case where all system entities are in the same module is another implementation alternative. In this special case all relations between entities are one-to-one. An example of such a system could be a configuration where a large database is representing a network server entity. It is obvious, based on FIGS. 2-5, that a DHCP server, configuration storage, storage manager and network server may be implemented within a single entity or that each node may be implemented in separate entities. Furthermore, it is also obvious that any other implementation alternative between the aforementioned implementations is possible.

Referring to FIG. 2, it is evident that relationships between adjacent network elements (i.e. 20-22, 22-24 and 24-26) may be one-to-one or one-to-many.

In the future when networks are becoming mobile and more heterogeneous, it may be assumed that these networks are representing potential new users of auto-configuration frameworks. In the heterogeneous environment like this, the nature of the required configuration data can vary a lot depending on factors such as type of users (terminal/network), type of terminal and type of network.

Figure 6:
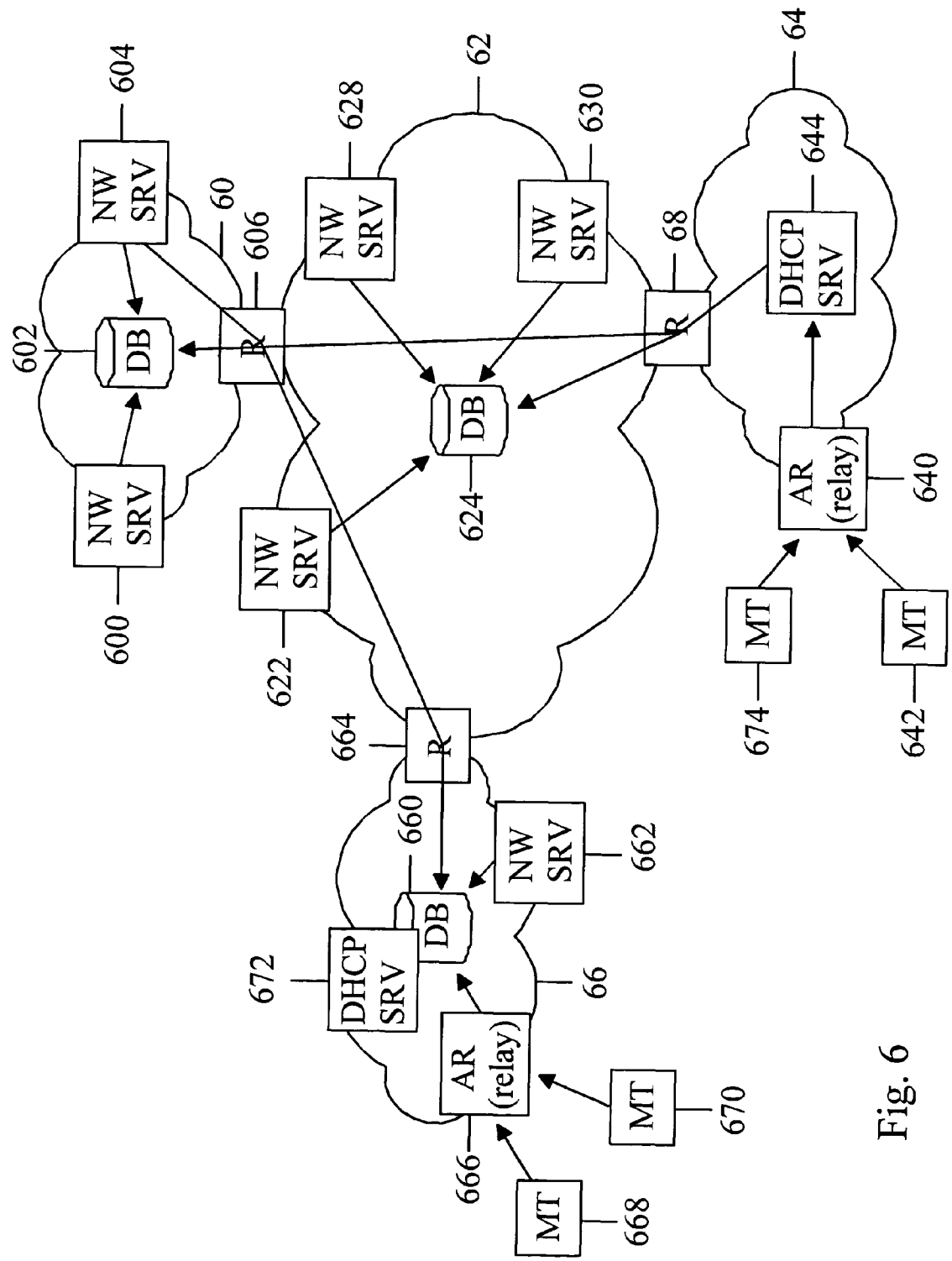
FIG. 6 is a block diagram illustrating a data communication network in which the invention may be used.

FIG. 6 discloses an overall system view of a data communication network in which the invention may be applied. FIG. 6 discloses four Dynamic Host Configuration Protocol (DHCP) frameworks 60, 62, 64 and 66 that are interconnected with each other via routers 68, 606 and 664. The system includes a set of DHCP servers 644, 672 each being connected to at least one configuration storage 602, 624, 660. For example, DHCP server 644 is connected to two configuration storages 624 and 602.

FIG. 6 presumes that a storage manager disclosed in FIGS. 2-5 is implemented together with a respective configuration storage. The system further comprises a plurality of network servers 600, 604, 622, 628, 630, 662 connected to at least one configuration storage. For example, network server 604 is connected to configuration storages 602 and 660 directly of via a router 606 or routers 606, 664.

Terminal devices, e.g. mobile terminals 674, 642, 668 and 670, are connected to a DHCP server via an access router 640 or 666.

If DHCP servers are used also by mobile terminals, configuration storages may be provided also e.g. with location, device model or device manufacturer specific configuration data. For example, mobile terminal's 668 address may be provided to DHCP server 672. In other words, the invention defines location sensitive DHCP configuration implementation that offers mobile terminals' location info as a part of DHCP auto-configuration phase for the DHCP server usage.

In one embodiment, location information of a mobile terminal may be added by the originating node (e.g. DHCPv6 client in the mobile terminal) or DHCPv6 Relay Agent or some other entity on the signaling path before the DHCP server. This implementation is not network architecture dependant. In other words, it can be applied to the $3^{rd}$ generation mobile networks as well as ad-hoc networks.

In another embodiment some proprietary method may be used by the DHCP server to request mobile terminal's location information based on its identity. This implementation may not be so generic as the previous one, but it would more secure and mobile terminal's privacy would be easier to maintain.

Either one of the previous embodiments can be used, for example, for the following purposes:

Load sharing among DHCP servers.

Location based address allocation.

Location based network parameter configuration.

Location information of a mobile terminal can be used, e.g. in large mobile networks, to do load sharing among DHCP servers so that DHCP Relay Agent decides to which DHCP server mobile terminal's DHCPv6 message is forwarded based on the location information. If the Relay Agent does not have this kind of information available, then it may forward the DHCP message normally toward DHCP server(s). And when the DHCP server receives the mobile terminal originated DHCP message, it either ignores or processes it based on the location information delivered via the message. If the DHCP server decides to process the received DHCP message, it may choose a correct set of parameters in the configuration storage or it may use a correct scheme of address allocation based on the location information. In another embodiment the mobile terminal's identity information is delivered with a DHCP message and then the DHCP server could request mobile terminal's location information based on the delivered identity.

Figure 7:
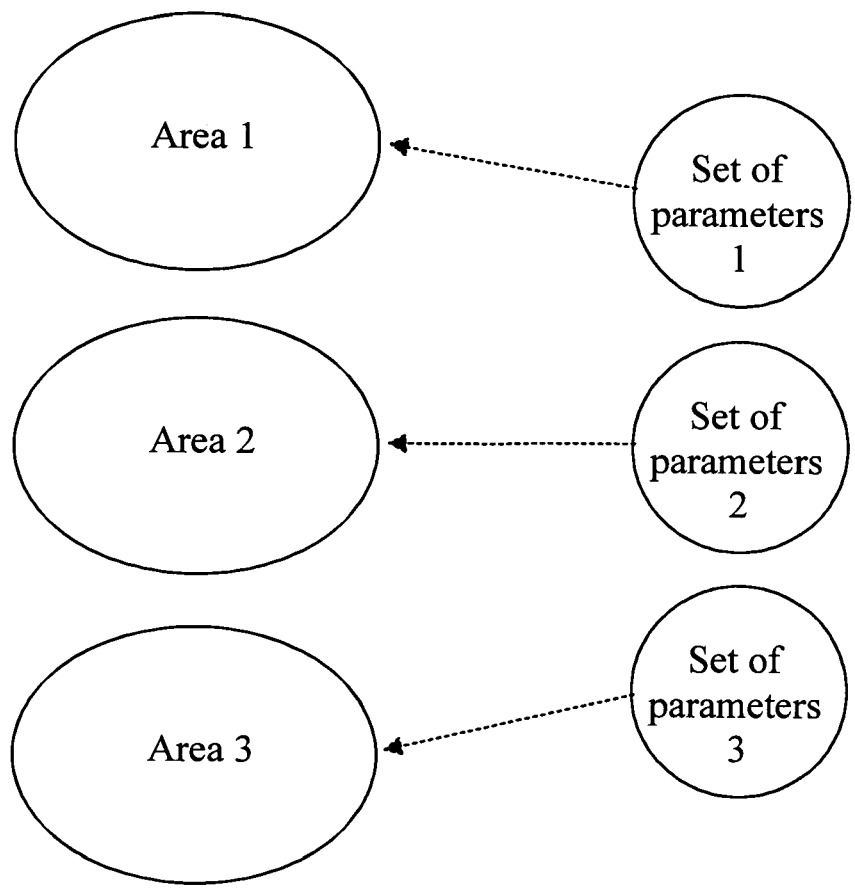
FIG. 7 is a block diagram illustrating different geographical areas and a set of parameters corresponding to the areas according to the invention.

FIG. 7 describes one embodiment including three different areas (Area 1, Area 2 and Area 3) and corresponding area-specific set of parameters (Set of parameters 1, Set of parameters 2 and Set of parameters 3). Mobile terminals are roaming around in the three areas and they might request some network configuration parameters using the DHCP protocol and the same DHCP framework. In other words, there are no area-specific DHCP frameworks. Based on mobile terminals' location information, a correct set of parameters can be delivered to them.

Depending on the security requirements, some type of encryption might be needed for the location information while transferring it via an IP packet because of privacy reasons. Furthermore, the mobile terminal's location information may be acquired in any appropriate way and by any appropriate network entity.

When implementing localized services in mobile or data networks, that is, services that are available only in certain part of a network and that are beneficial to a user only if the user is in a specific (geographical) area, it evidently becomes a problem for both the network and mobile terminal, how to keep track on what services are available in the specific network area and how this information can be made available in the mobile terminal.

Figure 8:
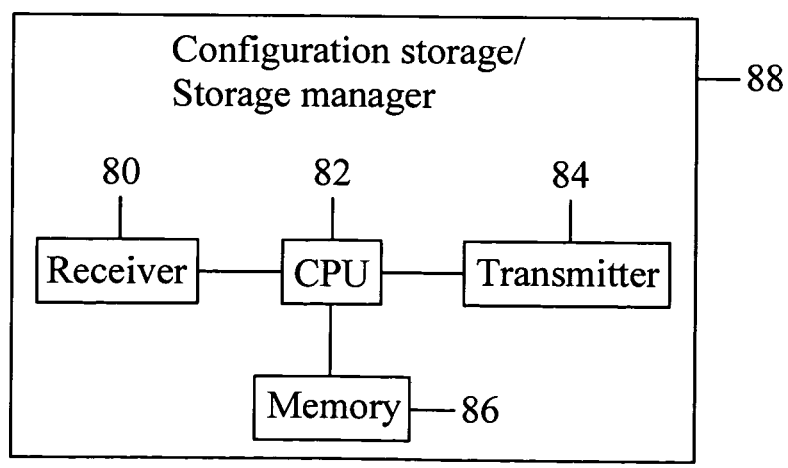
FIG. 8 is a block diagram illustrating an embodiment of a structure of a configuration storage or a storage manager.

FIG. 8 is a block diagram illustrating an embodiment of a structure of a configuration storage or a storage manager. In this embodiment, the structure disclosed in FIG. 8 may be applied both to a configuration storage and a storage manager. The configuration storage and storage manager are herein referred to as a network node 88.

Network node 88 comprises at least a central processing unit (CPU) 82. Furthermore, network node 88 comprises a receiver 80, a transmitter 84 and a memory 86 that are connected to CPU 82.

If network node 88 is a configuration storage, receiver 80 is configured to receive configuration parameter requests from a dynamic host configuration protocol (DHCP) server and to receive configuration data from a storage manager. Furthermore, transmitter 84 is configured to transmit configuration data requests to at least one storage manager and to transmit configuration parameters to at least one DHCP server. Memory 86 is configured to store configuration parameters to be used by at least one DHCP server.

If network node 88 is a storage manager, receiver 80 is configured to receive configuration parameter requests from at least one configuration storage and to receive configuration data from at least one network server. Furthermore, transmitter 84 is configured to transmit configuration data requests to at least one network server and to transmit received configuration data to at least one configuration storage.

FIG. 8 illustrates only a single memory 86 in network node 88. Memory 86 may refer to a single memory or memory area or to a plurality of memories or memory areas that may include e.g. random access memories (RAM), read-only memories (ROM) etc. Memory 86 may also include other applications or software components that are not described in more detail and also may include the computer program (or portion thereof), which when executed on the CPU 82 performs at least some of the method steps of the invention. CPU 82 may also include a memory or a memory may be associated therewith which may include the computer program (or portion thereof) which when executed on CPU 82 performs at least some of the method steps of the invention.

The invention enables provisioning of configuration parameters to mobile terminals according to their locations. These parameters may include e.g. an URL or other addressing information of a management server or other entity, which contains localized service information of a certain network area. When a mobile terminal adds its current location information to a DHCP message, to reply the DHCP server can automatically add the requested URL based on what services specific to the mobile terminal's location are made available. The location-specific information may be arranged to the DHCP server as was described in FIGS. 2-5.

The invention may be applied with DHCPv4 and DHCPv6.

It is obvious to a person skilled in the art that with the advancement of technology, the basic idea of the invention may be implemented in various ways. The invention and its embodiments are thus not limited to the examples described above, instead they may vary within the scope of the claims.

We claim:

1. A system, comprising:

a dynamic host control protocol server;

a configuration storage;

a storage manager;

a network server;

wherein the configuration storage is connected to the dynamic host control protocol server and to the storage manager, and is configured to store configuration data used by the dynamic host control protocol server, receive from the dynamic host control protocol server, a configuration data request relating to a mobile terminal, determine location information of the mobile terminal, select location specific configuration data related to available services that are specific to the mobile terminal's location based on the location information, send the location-specific configuration data to the dynamic host control protocol server, and trigger a configuration data request to the storage manager when applicable configuration data does not exist in the configuration storage;

wherein the storage manager is connected to the configuration storage and to the network server, and is configured to maintain the configuration data related to the available services that are specific to the mobile terminal's location in the configuration storage, manage signaling and data transfer between the configuration storage and the network server, dynamically update the configuration data related to available services that are specific to the mobile terminal's location in the configuration storage, provide the configuration storage with applicable configuration data in response to the configuration data request when the applicable configuration data is available, and trigger the configuration data request to the network server;

wherein the network server is connected to the storage manager and is configured to provide the storage manager with the configuration data related to available services that are specific to the mobile terminal's location, provide the storage manager with applicable configuration data in response to the configuration data request when the applicable configuration data is available, check whether the storage manager is allowed to receive the applicable configuration data, and provide the storage manager with the applicable configuration data when the storage manager is allowed to receive the applicable configuration data.

2. The system according to claim 1, wherein the storage manager is configured to remove expired configuration data from the configuration storage.

3. The system according to claim 1, wherein:

the storage manager is configured to monitor configuration data in the configuration storage and to request configuration data from the network server, and the network server is configured to provide the storage manager with the configuration data in response to receiving the request for configuration data from the storage manager when the configuration data is available.

4. The system according to claim 1, wherein the storage manager is configured to trigger the configuration data request to the network server based on at least one of the following rules:

the configuration storage sent a configuration data request for non-existent configuration data to the storage manager, the configuration data in the configuration storage is set to expire and an updated piece of configuration data is needed, and expiring configuration data is marked as essential in the configuration storage.

5. The system according to claim 1, wherein the network server is configured to send updated configuration data to the storage manager automatically.

6. The system according to claim 5, wherein the network server is configured to send the updated configuration data to the storage manager automatically before the configuration data in the configuration storage expires.

7. The system according to claim 1, wherein the configuration data stored in the configuration storage comprises at least one service entry.

8. The system according to claim 7, wherein the service entry in the configuration storage comprises at least one of the following:

a unique service identifier identifying a service, configuration data, and a time-to-live value for the configuration data.

9. The system according to claim 1, wherein a single entity comprises at least one of the dynamic host control protocol server, the configuration storage, the storage manager and the network server.

10. An apparatus, comprising:

a processor configured to maintain configuration data used by a dynamic host control protocol server in a configuration storage, wherein the configuration data is location-specific configuration data related to available services that are specific to a mobile terminal's location, manage signaling and data transfer between the configuration storage and a network server providing the location-specific configuration data, receive a configuration data request from the configuration storage when applicable configuration data does not exist in the configuration storage, dynamically update the configuration data related to available services that are specific to the mobile terminal's location in the configuration storage, provide the configuration storage with the applicable configuration data in response to the configuration data request when the applicable configuration data is available, trigger a configuration data request to the network server, and receive from the network server the applicable configuration data in response to the configuration data request when the applicable configuration data is available and when the network server has checked that the apparatus is allowed to receive the applicable configuration data.

11. The apparatus according to claim 10, wherein the processor is further configured to remove expired configuration data from the configuration storage.

12. The apparatus according to claim 10, wherein the processor is further configured to monitor configuration data in the configuration storage, to request configuration data from the network server and to receive configuration data from the network server when the configuration data is available.

13. The apparatus according to claim 10, wherein the processor is further configured to trigger the configuration data request to the network server based on at least one of the following rules:

the configuration storage sent a configuration data request for non-existent configuration data to the processor, the configuration data in the configuration storage is set to expire and an updated piece of configuration data is needed, and expiring configuration data is marked as essential in the configuration storage.

14. The apparatus according to claim 10, wherein the processor is implemented in an entity with the dynamic host control protocol server and the configuration storage.

15. An apparatus, comprising:

a processor configured to store configuration data used by a dynamic host control protocol server, be dynamically maintained and updated by a storage manager, receive, from the dynamic host control protocol server, a configuration data request relating to a mobile terminal, determine location information of the mobile terminal, select location specific configuration data related to available services that are specific to the mobile terminal's location based on the location information, send the location-specific configuration data to the dynamic host control protocol server in response to the configuration data request, generate a configuration data request to the storage manager when applicable configuration data does not exist or when applicable configuration data has expired in the configuration storage, and receive from the storage manager the applicable configuration data in response to the configuration data request when the applicable configuration data is available.

16. The apparatus according to claim 15, wherein the configuration data stored in the configuration storage comprises at least one service entry.

17. The apparatus according to claim 16, wherein the service entry in the apparatus comprises at least one of the following:
   a unique service identifier identifying a service,
   configuration data, and
   a time-to-live value for the configuration data.

18. The apparatus according to claim 15, wherein at least one of the apparatus, the dynamic host control protocol server and the storage manager are comprised within a single entity.

19. A computer program embodied on a non-transitory computer readable medium, the computer program configured to control a data-processing device to perform:
   maintaining configuration data used by a dynamic host control protocol server in a configuration storage, wherein the configuration data is location-specific configuration data related to available services that are specific to a mobile terminal's location,
   managing signaling and data transfer between the configuration storage and a network server providing the location-specific configuration data,
   receiving a configuration data request from the configuration storage when applicable configuration data does not exist in the configuration storage,
   dynamically updating the configuration data related to available services that are specific to the mobile terminal's location in the configuration storage,
   providing the configuration storage with the applicable configuration data in response to the configuration data request when the applicable configuration data is available,
   triggering a configuration data request to the network server, and
   receiving from the network server the applicable configuration data in response to the configuration data request when the applicable configuration data is available and when the network server has checked that the apparatus is allowed to receive the applicable configuration data.

20. A computer program embodied on a non-transitory computer readable medium, the computer program configured to control a data-processing device to perform:
   storing configuration data used by a dynamic host control protocol server,
   receiving, from the dynamic host control protocol server, a configuration data request relating to a mobile terminal,
   determining location information of the mobile terminal,
   selecting location specific configuration data related to available services that are specific to the mobile terminal's location based on the location information,
   sending the location specific configuration data to the dynamic host control protocol server in response to the configuration data request,
   generating a configuration data request to the storage manager when applicable configuration data does not exist or when applicable configuration data has expired in the configuration storage, and
   receiving from the storage manager the applicable configuration data in response to the configuration data request when the applicable configuration data is available.

21. A method, comprising:
   storing configuration data used by a dynamic host control protocol server,
   receiving, from the dynamic host control protocol server, a configuration data request relating to a mobile terminal,
   determining location information of the mobile terminal,
   selecting location-specific configuration data related to available services that are
   specific to the mobile terminal's location based on the location information,
   sending the location-specific configuration data to the dynamic host control protocol server in response to the configuration data request;
   generating a configuration data request to the storage manager when applicable configuration data does not exist or when applicable configuration data has expired in the configuration storage, and
   receiving from the storage manager the applicable configuration data in response to the configuration data request when the applicable configuration data is available.

* * * * *